United States Patent
Nakayama et al.

(10) Patent No.: US 10,305,083 B2
(45) Date of Patent: May 28, 2019

(54) WIRING MODULE AND POWER STORAGE MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Osamu Nakayama, Mie (JP); Naoki Fukushima, Mie (JP); Katsushi Miyazaki, Mie (JP); Seishi Kimura, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/744,283

(22) PCT Filed: Jul. 6, 2016

(86) PCT No.: PCT/JP2016/069974
§ 371 (c)(1),
(2) Date: Jan. 12, 2018

(87) PCT Pub. No.: WO2017/014049
PCT Pub. Date: Jan. 26, 2017

(65) Prior Publication Data
US 2018/0205062 A1    Jul. 19, 2018

(30) Foreign Application Priority Data

Jul. 17, 2015  (JP) ................................. 2015-143042
Dec. 28, 2015  (JP) ................................. 2015-256598

(51) Int. Cl.
| | |
|---|---|
| H01M 2/30 | (2006.01) |
| H01M 2/20 | (2006.01) |
| H02B 1/21 | (2006.01) |
| H01M 10/48 | (2006.01) |
| H01M 2/10 | (2006.01) |

(52) U.S. Cl.
CPC ........... *H01M 2/30* (2013.01); *H01M 2/1077* (2013.01); *H01M 2/204* (2013.01); *H01M 2/206* (2013.01);
(Continued)

(58) Field of Classification Search
None
See application file for complete search history.

(56) References Cited

U.S. PATENT DOCUMENTS

| | | | |
|---|---|---|---|
| 2007/0026739 A1* | 2/2007 | Kim ...................... | H01M 2/206 439/627 |
| 2011/0081568 A1* | 4/2011 | Kim ...................... | H01M 2/206 429/158 |

(Continued)

OTHER PUBLICATIONS

International Search Report for Application No. PCT/JP2016/069974 dated Aug. 2, 2016; 7 pages.

*Primary Examiner* — Amanda J Barrow
(74) *Attorney, Agent, or Firm* — Reising Ethington, P.C.

(57) ABSTRACT

A wiring module to be attached to a power storage element group in which a plurality of power storage elements having cathodes composed of a first metal and anodes composed of a second metal that is different from the first metal are aligned, includes: bus bars having first metal portions composed of the first metal and second metal portions composed of the second metal; an insulating protector for housing the bus bars; and detection terminals connected to the bus bars. The bus bars have overlapping portions at which portions of the first and second metal portions overlap, the overlapping portions have welded portions at which the first and second metal portions are welded, and the bus bars have terminal (Continued)

connection portions on which the detection terminals are overlaid, at positions different from the positions of the welded portions.

5 Claims, 18 Drawing Sheets

(52) U.S. Cl.
CPC ............ *H01M 10/482* (2013.01); *H02B 1/21* (2013.01); *H01M 2220/20* (2013.01)

(56) References Cited

U.S. PATENT DOCUMENTS

| | | | | |
|---|---|---|---|---|
| 2011/0293995 A1* | 12/2011 | Sasaki | ................... | H01M 2/202 429/158 |
| 2012/0100761 A1* | 4/2012 | Grosse | ................... | H01M 2/202 439/774 |
| 2012/0208410 A1* | 8/2012 | Ikeda | ..................... | H01M 2/206 439/883 |
| 2013/0280959 A1 | 10/2013 | Takase et al. | | |
| 2013/0306353 A1* | 11/2013 | Zhao | ..................... | H01M 2/206 174/133 B |
| 2014/0017532 A1* | 1/2014 | Nishihara | ............. | H01M 2/206 429/90 |
| 2014/0080364 A1* | 3/2014 | Nakayama | .......... | H01M 2/1077 439/765 |
| 2014/0272520 A1 | 9/2014 | Kim | | |
| 2015/0064516 A1* | 3/2015 | Swoish | ................. | H01M 2/206 429/61 |
| 2016/0141583 A1* | 5/2016 | Kim | ....................... | H01M 2/30 429/158 |

\* cited by examiner

*Figure 3*
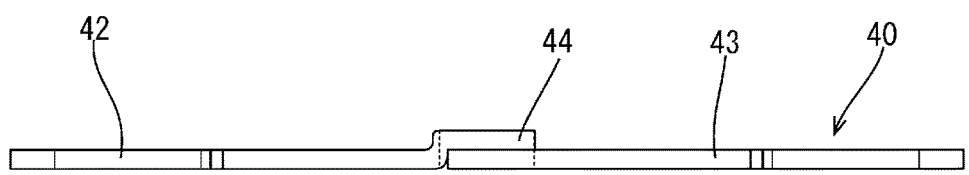
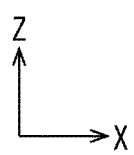

*Figure 14*
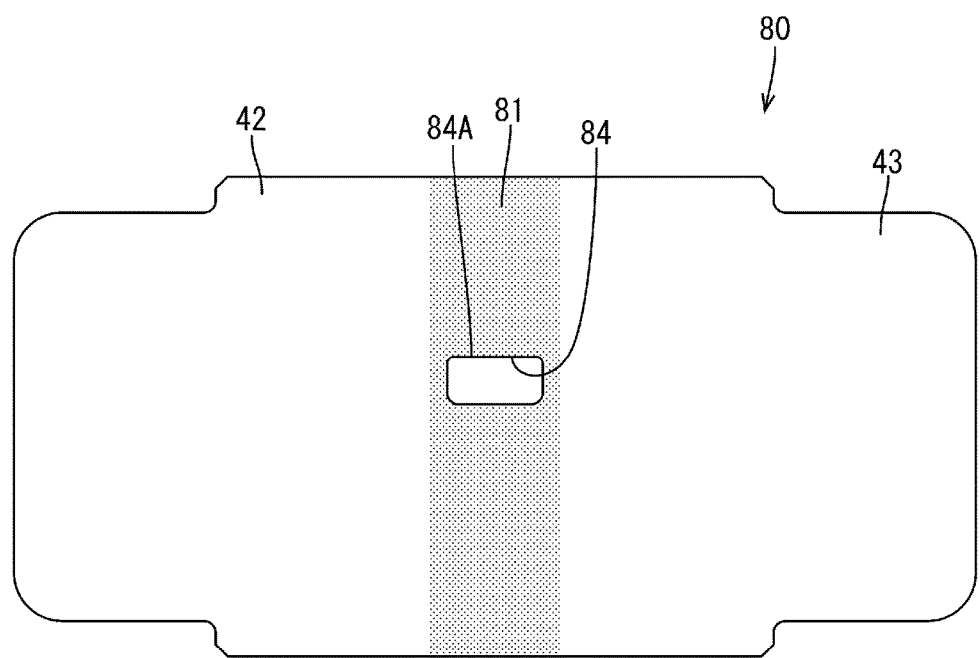
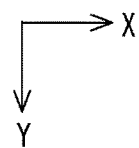

WIRING MODULE AND POWER STORAGE MODULE

CROSS REFERENCE TO RELATED APPLICATIONS

This application claims the priority of Japanese patent applications JP2015-143042 filed on Jul. 17, 2015 and JP2015-256598 filed on Dec. 28, 2015, the entire contents both of which are incorporated herein.

TECHNICAL FIELD

The present invention relates to a wiring module, and a power storage module obtained by attaching the wiring module to a power storage element group.

BACKGROUND ART

Patent Document 1 (JP 2011-210480A) discloses a bus bar attached to a battery with a cathode for which aluminum is used and an anode for which copper is used. With this bus bar, a cathode connection portion composed of aluminum and an anode connection portion composed of copper are integrally coupled through metallic bonding.

The above-described cathode and anode have bolt shapes with outer circumferential surfaces provided with screw threads. Insertion holes into which the cathode and the anode are to be inserted are formed on the bus bar. By screwing nuts on the cathode and the anode with the cathode and the anode inserted in the insertion holes of the bus bar, the bus bar is electrically connected to the cathode and the anode.

Also, Patent Document 2 (JP 2013-16382A) discloses a configuration in which a detection terminal is connected to an electrode terminal of a battery. The detection terminal has an insertion hole into which a bolt is inserted. Due to the bolt being screwed into a screw hole formed in the electrode terminal with the detection terminal overlaid on the electrode terminal, the detection terminal and the electrode terminal are fastened and are thus electrically connected.

SUMMARY

With the bus bar disclosed in Patent Document 1, the cathode connection portion and the anode connection portion are subjected to metallic bonding in an ultra-high-pressure isostatic environment, and therefore manufacturing cost is incurred, which is a problem. In view of this, as a hypothetical technique, it is conceivable that the cathode connection portion and the anode connection portion are welded.

However, according to the configurations disclosed in Patent Document 1 and Patent Document 2, a task of screwing bolts or nuts is needed in order to connect the bus bar and the electrodes of a battery. It is troublesome to perform a screwing task on multiple bus bars connected to multiple batteries. In view of this, as a hypothetical technique, it is conceivable that the bus bar and the electrodes of the battery are welded.

However, if the bus bar and the electrodes of the battery are connected by welding, the detection terminal cannot be jointly fastened to the electrodes of the battery along with the bus bar. In view of this, as a hypothetical technique, it is conceivable that the detection terminal is welded to the bus bar.

However, there is desire to make the area of the portion at which the bus bar and the electrodes of the battery are welded as large as possible in order to ensure the reliability of the electrical connection. For this reason, it is not preferable to weld the detection terminal to the portion at which the bus bar and the electrodes of the battery are welded.

In view of this, it is conceivable that the detection terminal is welded at the portion at which the cathode connection portion and the anode connection portion are welded. However, when the cathode connection portion and the anode connection portion are connected, unevenness is formed on the surface of the portion at which the cathode connection portion and the anode connection portion are welded. For this reason, there is concern that the electrical reliability between the bus bar and the detection terminal will decrease.

The technique disclosed in the present specification was completed based on the foregoing circumstances and aims to provide a technique for improving the reliability of an electrical connection between the bus bar and the detection terminal.

The technique disclosed in the present specification is a wiring module to be attached to a power storage element group in which a plurality of power storage elements having cathodes composed of a first metal and anodes composed of a second metal that is different from the first metal are aligned, including: bus bars having first metal portions composed of the first metal and second metal portions composed of the second metal; an insulating protector for holding the bus bars; and detection terminals connected to the bus bars. The bus bars have overlapping portions at which portions of the first metal portions and portions of the second metal portions overlap, the overlapping portions have welded portions at which the first metal portions and the second metal portions are welded, and the bus bars have terminal connection portions on which the detection terminals are overlaid, at positions different from the positions of the welded portions.

According to the technique disclosed in the present specification, the positions of the terminal connection portions differ from those of the welded portions at which the first metal portions and the second metal portions are welded. Accordingly, the unevenness caused by welding the first metal portions and the second metal portions does not occur on the surfaces of the terminal communication portions. As a result, the detection terminals are overlaid on the terminal connection portions that are flat compared to the welded portions, and therefore it is possible to improve the reliability of the electrical connections between the detection terminals and the bus bars.

The following aspects are preferable as embodiments of the present design.

It is preferable that the overlapping portions include locking portions for holding the detection terminals on the terminal connection portions, and the detection terminals have locking receiving portions for locking to the locking portions.

According to the above-described configuration, the detection terminals can be held on the terminal connection portions of the overlapping portions due to the locking portions and the locked portions being locked.

It is preferable that the terminal connection portions are provided at positions of the overlapping portions that are different from the positions of the welded portions.

Since the regions other than the overlapping portions are relatively flat, it is possible to preferably connect the bus bars and the cathodes and anodes. Accordingly, it is possible to improve the reliability of the electrical connections between the bus bars and the cathodes and anodes.

It is preferable that the terminal connection portions are provided at positions that are different from the positions of the overlapping portions.

According to the above-described configuration, the detection terminals are connected to the bus bars at the relatively flat portions of the bus bars. As a result, it is possible to further improve the reliability of the electrical connections between the detection terminals and the bus bars.

It is preferable that the detection terminals and the bus bars are welded on the terminal connection portions.

According to the above-described configuration, the bus bars and the detection terminals can be electrically connected through welding, which is a simple method, and therefore the manufacturing cost can be reduced.

With a power storage module including the above-described wiring module attached to the power storage element group, it is preferable that the first metal portions of the bus bars and the cathodes are welded, and the second metal portions of the bus bars and the anodes are welded.

According to the above-described configuration, it is possible to connect the bus bars and the cathodes and to connect the bus bars and the anodes through welding. Accordingly, it is possible to improve the task efficiency compared to the case of connecting the bus bars and the cathodes and anodes by screwing bolts or nuts.

According to the technique disclosed in the present specification, it is possible to improve the reliability of the electrical connections between the bus bars and the detection terminals.

BRIEF DESCRIPTION OF DRAWINGS

FIG. 3 is a front view showing a bus bar.

FIG. 14 is a plan view showing a bus bar according to Embodiment 2.

DESCRIPTION OF EMBODIMENTS

Embodiment 1

Embodiment 1 will be described with reference to FIGS. 1 to 13. A wiring module 1 of the present embodiment forms a power storage module M by being attached to a power storage element group 60 constituted by multiple aligned power storage elements 61. The power storage module M is mounted in a vehicle (not shown) such as an electric automobile or a hybrid automobile and is used as a power source for driving the vehicle.

Note that in the following description, description will be given with the X direction set as rightward, the Y direction set as frontward, and the Z direction set as upward. Also, if there are multiple identical members, one member is denoted by a reference sign and other members are not, in some cases.

Figure 1:
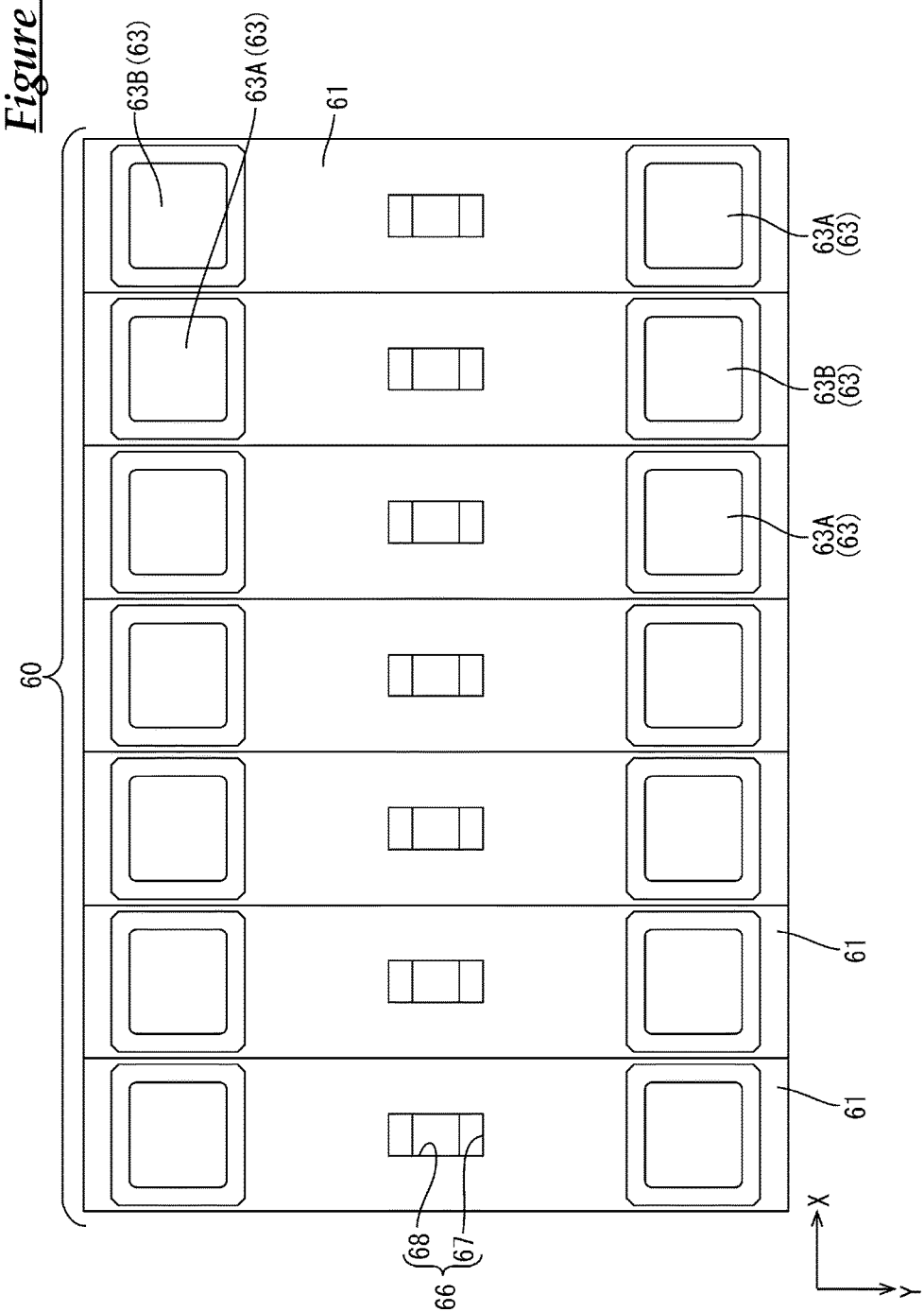
FIG. 1 is a plan view showing a power storage element group according to Embodiment 1.

The power storage elements 61 of the present embodiment are secondary batteries. As shown in FIG. 1, multiple power storage elements 61 are aligned in a row to form the power storage element group 60.

As shown in FIG. 1, each power storage element 61 has a flat cuboid outer shape. A pair of electrode terminals 63 are arranged at positions near the two end portions in the lengthwise direction (front-rear direction) on the upper surface of the power storage element 61. Each electrode terminal 63 has a rectangular cylindrical shape and protrudes upward from the surface of the power storage element 61 (see FIG. 12).

One of the electrode terminals 63 is a cathode 63A and the other is an anode 63B. The cathode 63A is composed of aluminum or an aluminum alloy (an example of a first metal). The anode 63B is composed of copper or a copper alloy (an example of a second metal).

A locked portion 66 for locking a locking piece 36 of a later-described insulating protector 10 is provided between the pair of electrode terminals 63 of one power storage element 61. The locked portion 66 has a form in which a hole portion 68 is provided in the central portion of a recessed portion 67 that is depressed in a recessed shape from the surface of the power storage element 61 (see FIGS. 1 and 12).

The multiple power storage elements 61 are aligned such that electrode terminals 63 with different polarities are adjacent to each other in two adjacent power storage elements 61 (in other words, such that the cathode 63A of one power storage element 61 and the anode 63B of another power storage element 61 adjacent thereto are adjacent to each other).

The wiring module 1 is attached to the upper surface of the power storage element group 60. Specifically, the wiring module 1 is attached to the surface of the power storage element group 60 that is formed by the upper surfaces of the power storage elements 61. The wiring module 1 includes an insulating protector 10, bus bars 40 that are held in the insulating protector 10 and connect the cathodes 63A and anodes 63B of adjacent power storage elements 61, detection terminals 50 that are arranged overlaid on and are electrically connected to the bus bars 40, and wires 58 that are connected to the detection terminals 50.

Figure 2:
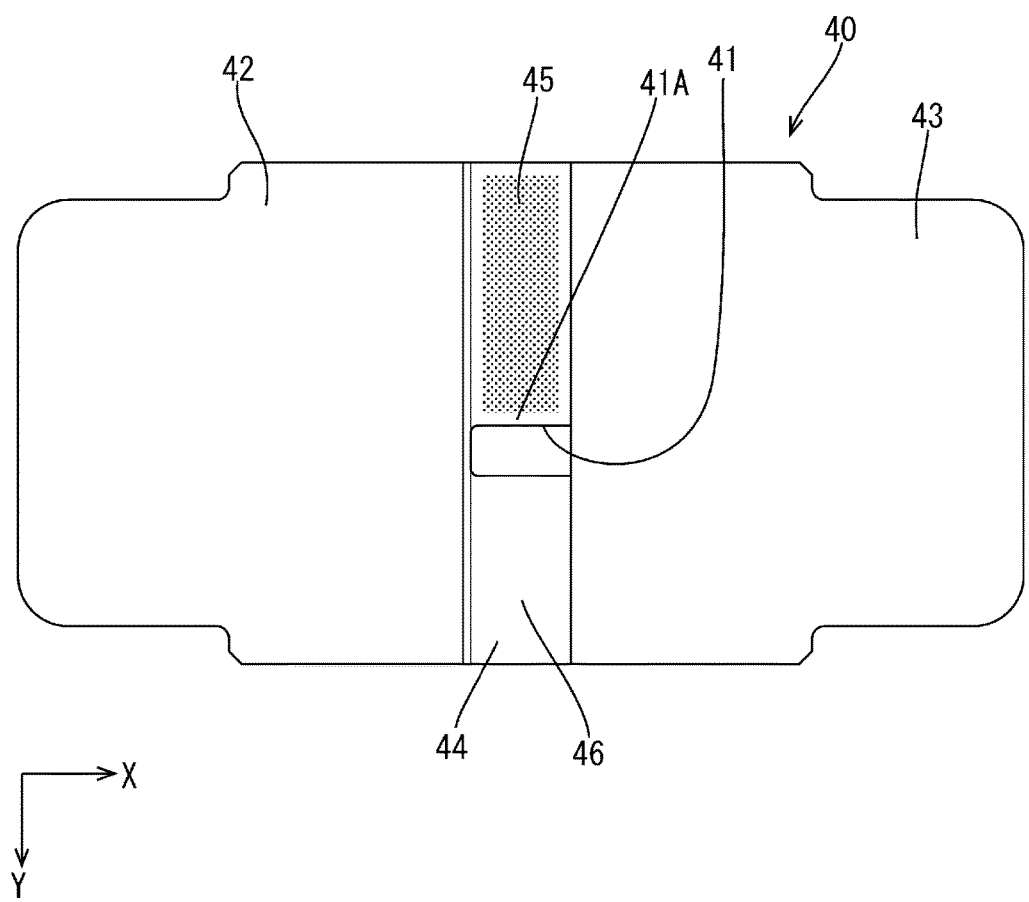
FIG. 2 is a plan view showing a bus bar.

As shown in FIG. 2, the bus bar 40 is composed of a metal plate material with an approximately rectangular shape. The four corners of the bus bar 40 are recessed inward. The bus bar 40 includes a first metal portion 42 composed of aluminum or an aluminum alloy, and a second metal portion 43 composed of copper or a copper alloy. The first metal portion 42 is arranged on the left side of the bus bar 40 and the second metal portion 43 is arranged on the right side of the bus bar 40. The first metal portion 42 is constituted by the same metal as the cathode 63A. Also, the second metal portion 43 is constituted by the same metal as the anode 63B.

Also, the first metal portion 42 and the second metal portion 43 are constituted by different metals.

Figure 4:
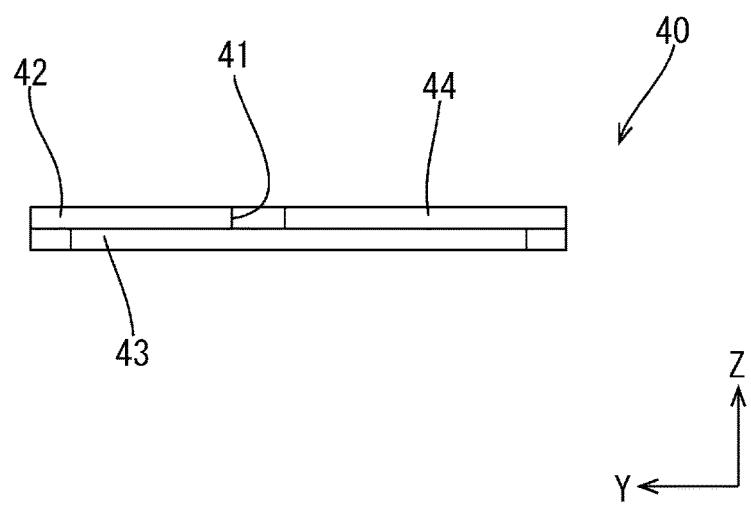
FIG. 4 is a side view showing a bus bar.

As shown in FIG. 3, the right end portion of the first metal portion 42 is bent upward in a crank shape. As shown in FIGS. 3 and 4, the right end portion of the first metal portion 42 overlaps with the left end portion of the second metal portion 43. The portion at which the first metal portion 42 and the second metal portion 43 overlap is an overlapping portion 44. As shown in FIG. 2, the overlapping portion 44 is located in the approximate center in the left-right direction of the bus bar 40.

As shown in FIG. 2, at a location that is slightly rearward with respect to the center in the front-rear direction, the overlapping portion 44 includes a welded portion 45 at which the first metal portion 42 and the second metal portion 43 are welded. In FIG. 2, the welded portion 45 is indicated with shading.

As shown in FIG. 2, the overlapping portion 44 is formed such that a rectangular locking hole 41 for locking an insertion portion 55 (an example of a locking receiving portion) of the later-described detection terminal 50 penetrates through the plate surface at a position that is slightly frontward with respect to the center in the front-rear direction. The insertion portion 55 locks to a hole edge portion 41A (an example of a locking portion) of the locking hole 41.

The region of the overlapping portion 44 that is located frontward with respect to the welded portion 45 and frontward with respect to the locking hole 41 is a terminal connection portion 46 on which the detection terminal 50 is overlaid. The first metal portion 42 and the second metal portion 43 are not welded at the terminal connection portion 46.

The insulating protector 10 of the present embodiment is constituted by coupling multiple coupling units 11. In the present embodiment, three coupling units 11A, 11B, and 11C are aligned in the alignment direction of the multiple power storage elements 61. In the following description, the first coupling unit 11A is the coupling unit 11 that is arranged on the right end in FIG. 5, the second coupling unit 11B is the coupling unit 11 that is arranged adjacent thereto (in the center), and the third coupling unit 11C is the coupling unit 11 that is arranged on the left end. Also, in a case where no distinction is made between the first coupling unit 11A, the second coupling unit 11B, and the third coupling unit 11C, description will be given using the coupling unit 11.

Figure 6:
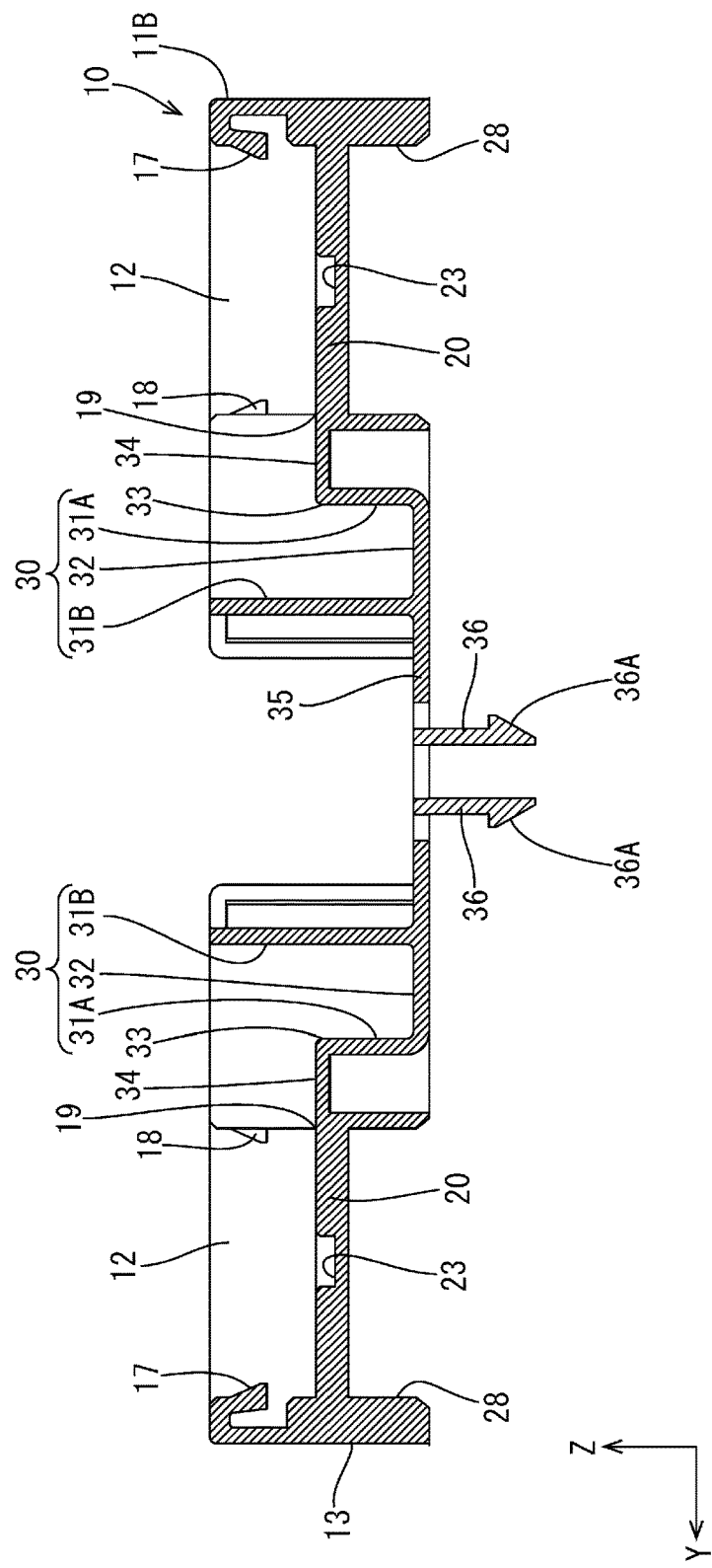
FIG. 6 is a cross-sectional view taken along line VI-VI in FIG. 5.

As shown in FIG. 6, one coupling unit 11 includes a pair of bus bar holding portions 12 that are open in the vertical direction and house and hold the bus bars 40, and a pair of wire housing grooves 30 for housing detection wires 58 that are connected to the detection terminals 50 arranged overlaid on the bus bars 40.

The bus bar holding portions 12 include rectangular cylindrical housing walls 13. The bus bars 40 are held inside of the housing walls 13. The bus bars 40 held in the adjacent bus bar holding portions 12 are held in an insulated state by the housing walls 13. The housing wall 13 is constituted by a pair of long walls 14 and a pair of short walls 15 that couple the pair of long walls 14. The dimensions of the pairs of long walls 14 and short walls 15 are set to be dimensions according to which the pair of electrode terminals 63 arranged adjacent to each other can be housed inside of the housing wall 13. The housing wall 13 functions also as a protection wall for the adjacent electrode terminals 63.

Figure 5:
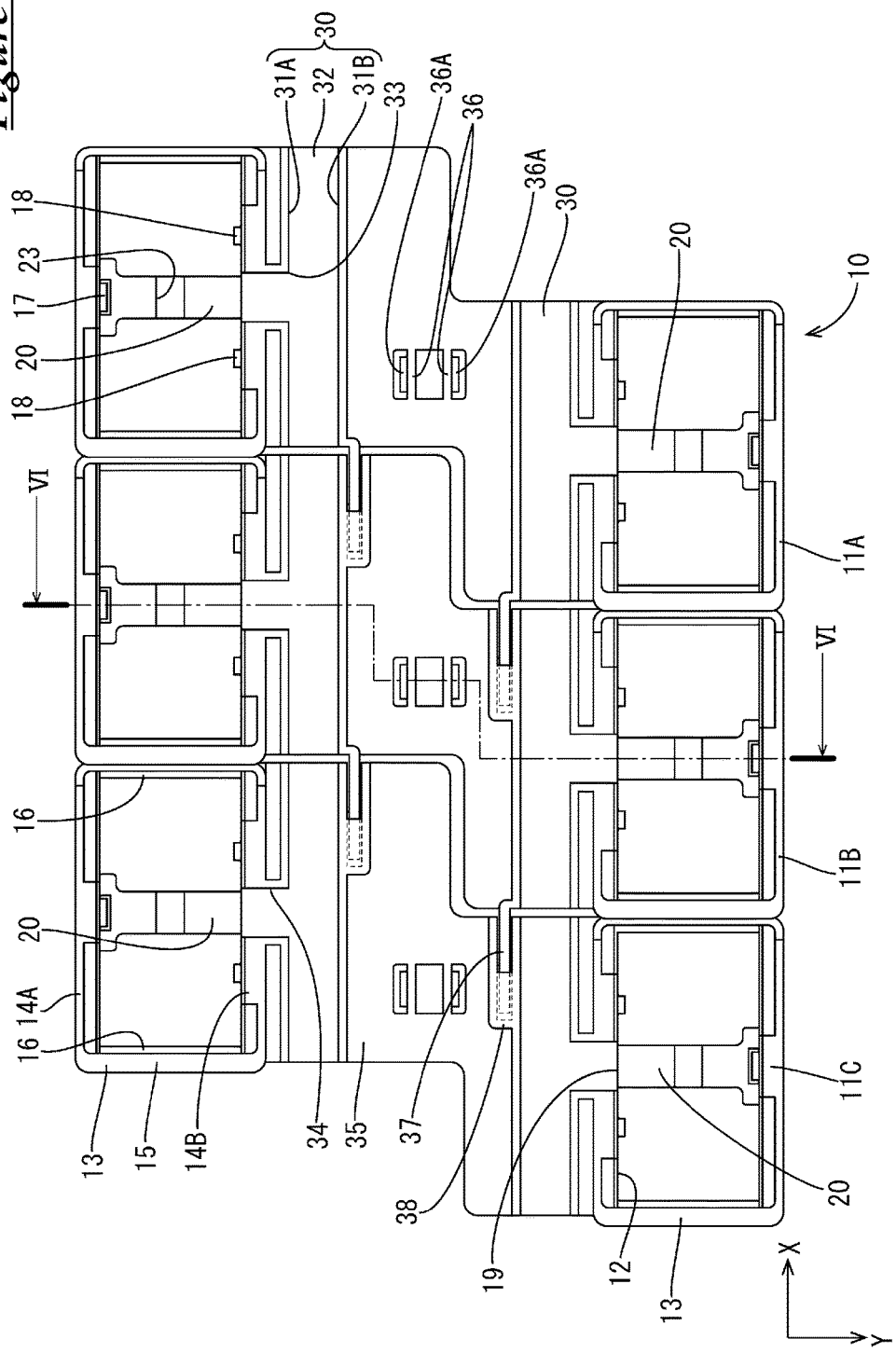
FIG. 5 is a plan view showing an insulating protector.

As shown in FIG. 5, the pair of housing walls 13 provided on one coupling unit 11 are arranged so as to face each other with the long walls 14 parallel to each other, and are arranged shifted in the extension direction (left-right direction) of the long walls 14 by a dimension corresponding to one electrode terminal 63. Hereinafter, among the four long walls of one coupling unit 11, the pair of long walls located on the outer side in the front-rear direction are outer-side long walls 14A, and the pair of long walls 14 located on the inner side (between the pair of outer-side long walls 14A) are inner-side long walls 14B.

As shown in FIGS. 5 and 6, mounting portions 16 that protrude inward of the housing wall 13 are provided over the entire region in the front-rear direction of the short walls 15 at the approximate central portion in the vertical direction of the pair of short walls 15. This pair of mounting portions 16 supports the two end portions in the lengthwise direction (left-right direction) of the bus bar 40 housed in the housing wall 13 from below (see FIG. 10).

Also, a first retaining piece 17 that retains the bus bar 40 housed in the housing wall 13 from above is provided in the central portion in the lengthwise direction of the outer-side long wall 14A. On the other hand, a pair of second retaining pieces 18 that similarly retain the bus bar 40 housed in the housing wall 13 from above are provided slightly toward the two end portions with respect to the central portion in the lengthwise direction of the inner-side long wall 14B. The first retaining piece 17 and the second retaining pieces 18 have flat spring shapes that extend diagonally downward from the upper end portions of the long walls 14 toward the inside of the housing wall 13, and can elastically deform in the direction of moving toward or away from the long walls 14.

A wire guiding port 19 for guiding a wire 58 connected to a later-described detection terminal 50 toward a wire housing groove 30 is formed between the pair of second retaining pieces 18 (in the center in the lengthwise direction of the long walls 14) on the inner-side long wall 14B. The wire guiding port 19 is continuous with a groove-shaped barrel holding groove 34 that couples the bus bar holding portion 12 and the later-described wire housing groove 30.

The bus bar holding portion 12 of the present embodiment is provided with a welding protection portion 20. The welding protection portion 20 is arranged so as to bridge between the outer-side long wall 14A and the inner-side long wall 14B in the left-right direction in the center in the lengthwise direction (the left-right direction).

Figure 10:
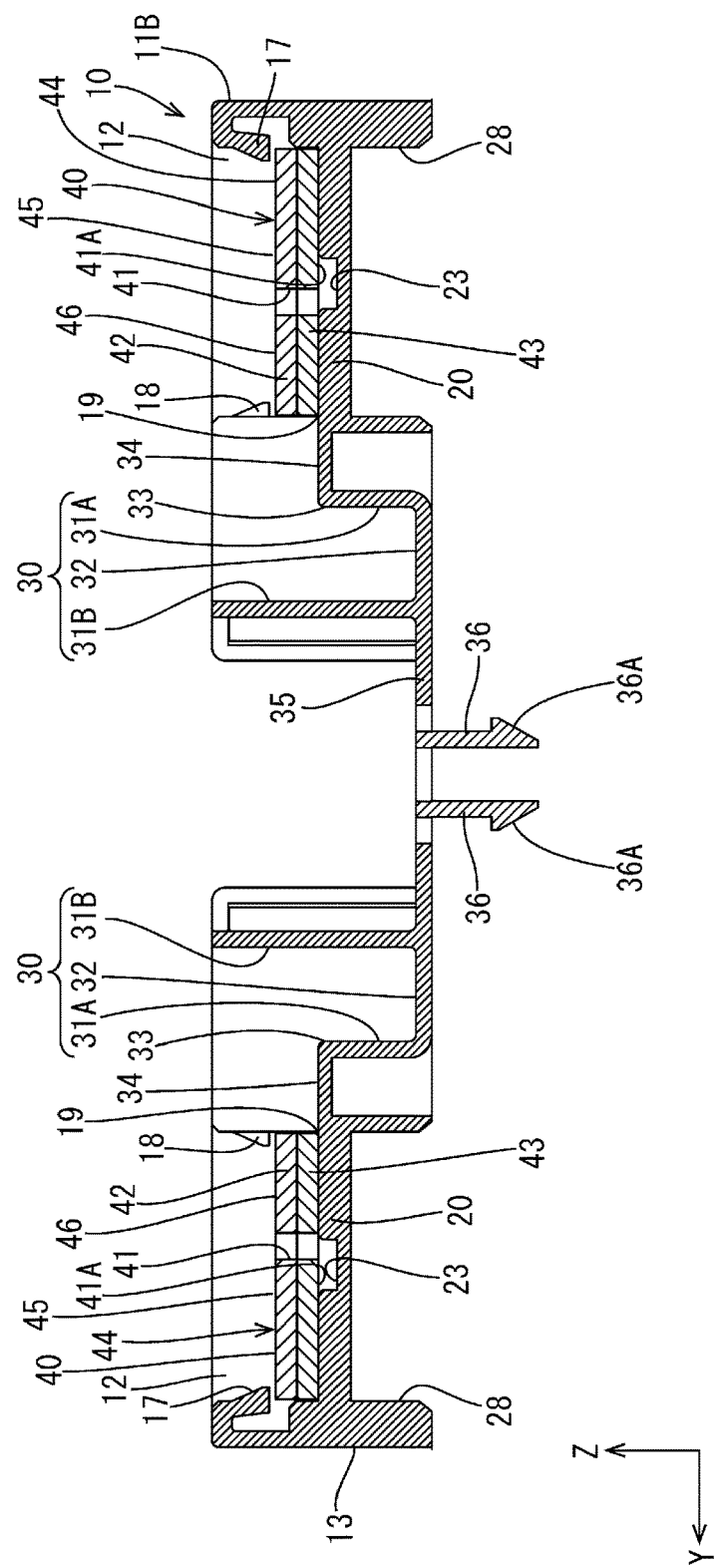
FIG. 10 is a cross-sectional view taken along line X-X in FIG. 9.
Figure 11:
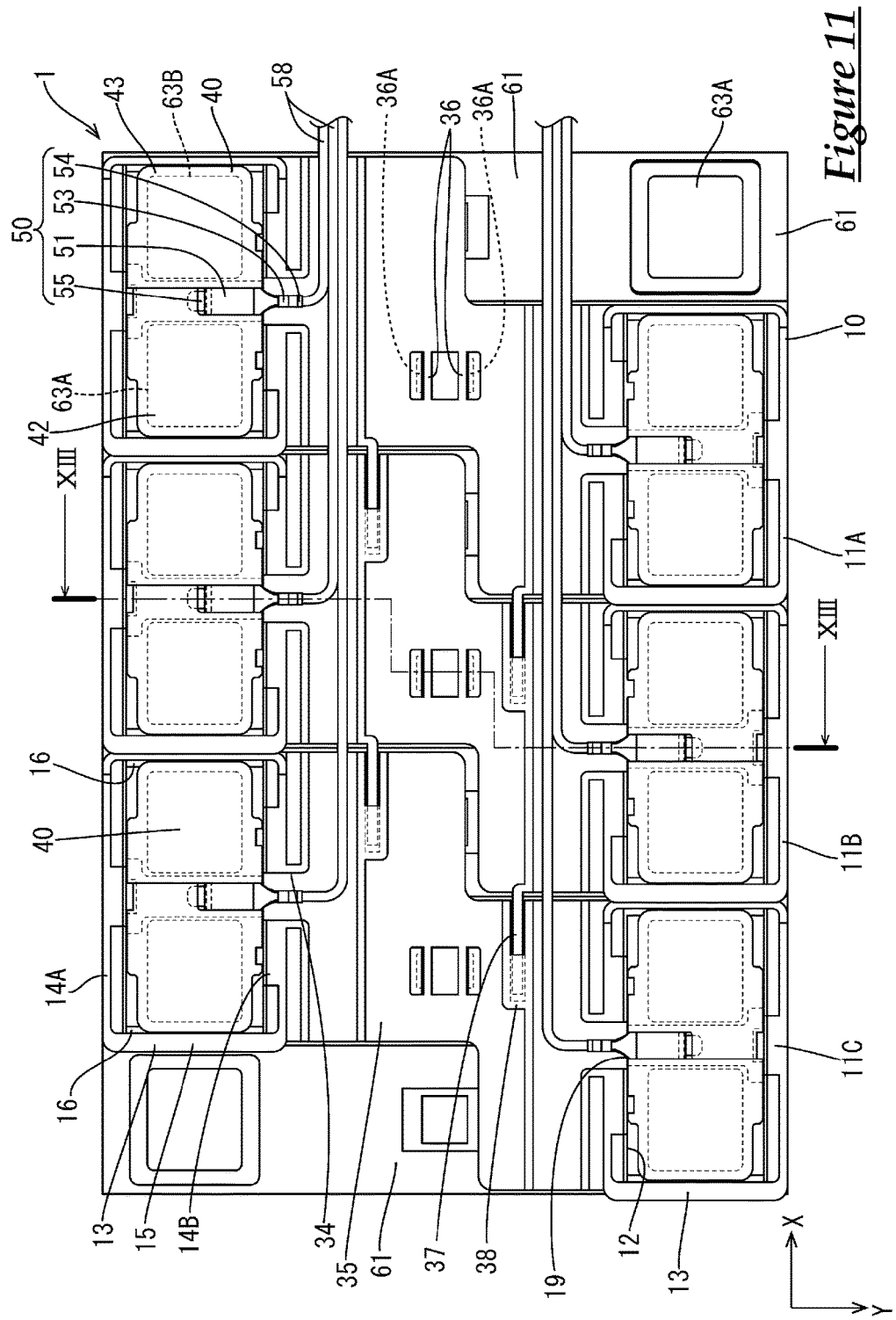
FIG. 11 is a plan view showing a power storage module.
Figure 12:
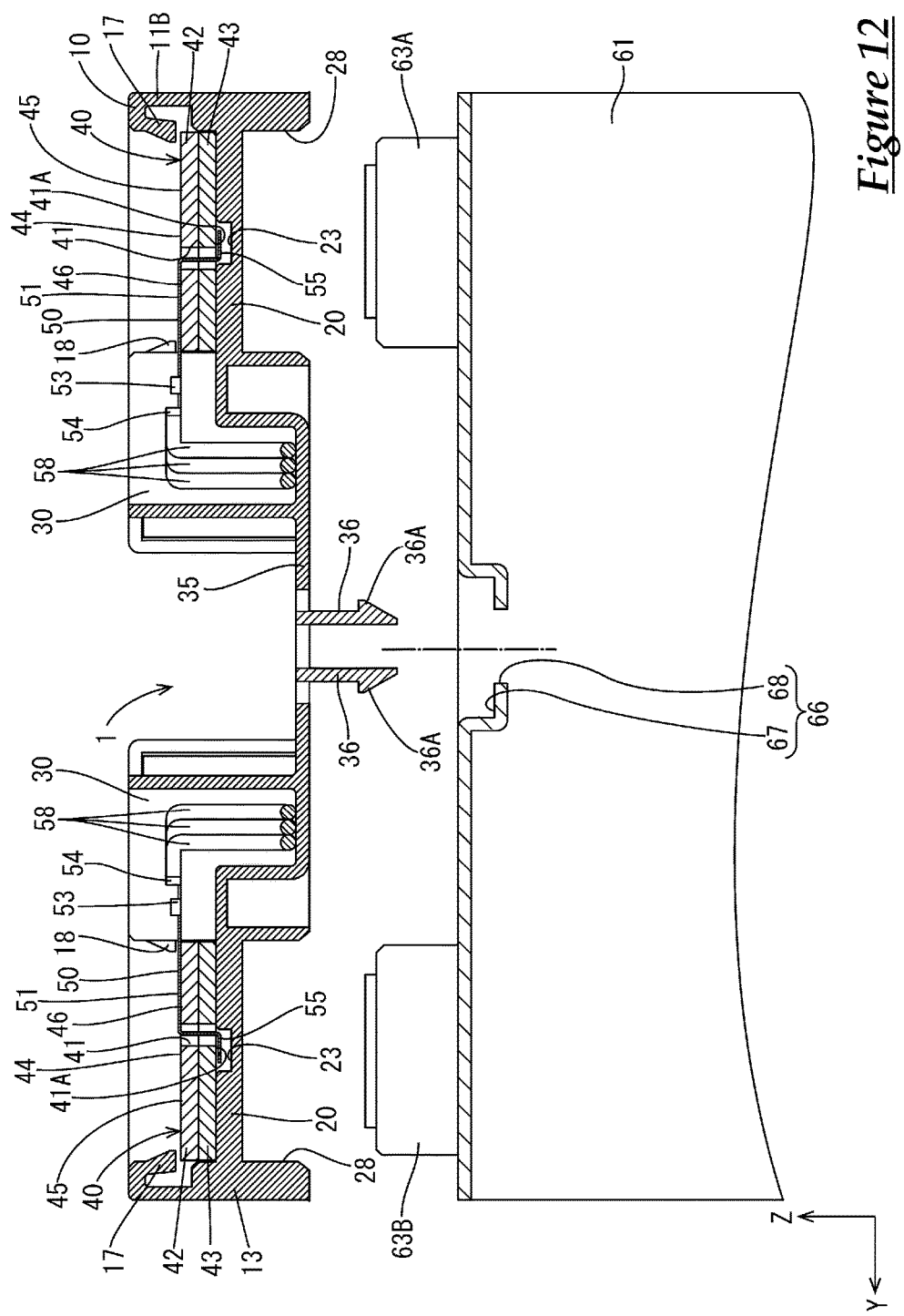
FIG. 12 is a cross-sectional view showing a step of attaching a power storage module to a power storage element group.
Figure 13:
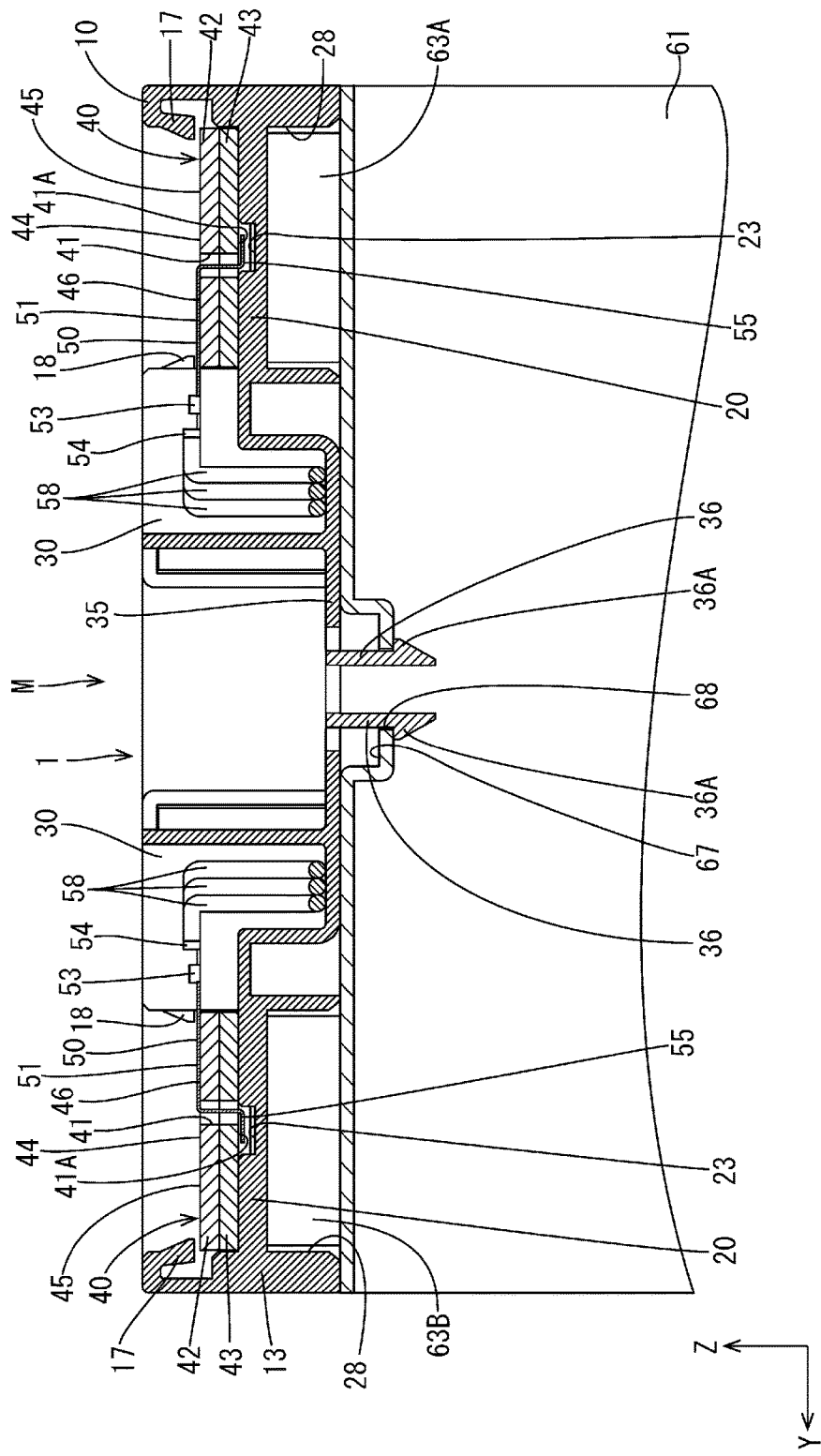
FIG. 13 is a cross-sectional view taken along line XIII-XIII in FIG. 11.

As shown in FIG. 10, on the upper surface of the welding protection portion 20, the vicinity of the center in the front-rear direction sinks downward and is one step lower, and this lower portion is a relief recessed portion 23 that allows a later-described insertion portion 55 of the detection terminal 50 to pass. Note that the engaging hole 41 of the above-described bus bar 40 is set such that at least a portion thereof is arranged at a position corresponding to the relief recessed portion 23 (see FIG. 10).

As shown in FIG. 5, the pair of wire housing grooves 30 each include a pair of groove wall portions 31 and a bottom portion 32, and are provided so as to be adjacent to the bus bar holding portions 12 between the pair of bus bar holding portions in one coupling unit 11, and so as to extend in the lengthwise direction (front-rear direction) of the bus bar holding portion 12. A wire inlet 33 that is continuous with the barrel holding groove 34 and through which the wire 58 that is pulled out from the bus bar holding portion 12 is introduced into the wire housing groove 30 is formed in the groove wall portion 31A on the bus bar holding portion 12 side of the pair of groove wall portions 31.

As shown in FIG. 6, the pair of wire housing grooves 30 provided in one coupling unit 11 are coupled by a coupling portion 35. The coupling portion 35 is a plate-shaped member that couples the lower edges of the groove wall portions 31B of the pair of wire housing grooves 30. As described above, since the pair of bus bar holding portions 12 are arranged shifted by a dimension corresponding to one electrode terminal 63 in the lengthwise direction (left-right direction), the coupling portions 35 extended from the groove wall portions 31B are coupled shifted by a dimension corresponding to one electrode terminal 63 in the left-right direction (see FIG. 5). Accordingly, the coupling portions 35 are approximately Z-shaped overall in plan view.

A pair of locking pieces 36 that protrude downward are provided at positions corresponding to the locked portion 66 of the power storage elements 61 in a state in which the insulating protector 10 is assembled in the power storage element group 60 in the coupling portion 35. Locking protruding portions 36A that protrude outward are provided on the lower end portion of the locking pieces 36, and the insulating protector 10 is fixed to the power storage element group 60 due to the locking protruding portions 36A locking to the edge portions of the hole portion 68 of the locked portions 66.

Also, the coupling portion 35 is provided with a unit engagement portion 37 and/or a unit engagement receiving portion 38 for coupling with an adjacent coupling unit 11.

Here, to give a description with a distinction made between the coupling units 11, the first coupling unit 11A is provided with a pair of plate-shaped unit engagement portions 37 that extend toward the second coupling unit 11B from the side edge located on the second coupling unit 11B side among the pair of side edges of the coupling portion 35. The unit engagement portion 37 has engagement claws on its leading end, although this is not shown in detail in the drawing.

Also, the coupling portion 35 of the second coupling unit 11B is provided with a portion with a greater plate thickness at a position corresponding to the unit engagement portions 37 of the first coupling unit 11A, and this portion is provided with recessed unit engagement reception portions 38 that can receive the unit engagement portions 37 of the first coupling unit 11A. The unit engagement reception portions 38 include protruding pieces with which the engagement claws of an adjacent coupling unit 11 are engaged, although this is not shown in detail in the drawings.

Also, the side edge located on the third coupling unit 11C side among the pair of side edges of the coupling portion 35 of the second coupling unit 11B is provided with a pair of unit engagement portions 37 that are similar to the unit engagement portions 37 of the first coupling unit 11A.

Furthermore, the side edge located on the second coupling unit 11B side among the pair of side edges of the coupling portion 35 of the third coupling unit 11C is provided with a pair of unit engagement reception portions 38 that are similar to the unit engagement reception portions 38 of the second coupling unit 11B, at positions corresponding to the unit engagement portions 37 of the second coupling unit 11B.

Due to the unit engagement portions 37 and the unit engagement reception portions 38 of the coupling units 11 engaging with each other, the adjacent coupling units 11 are coupled to each other and the insulating protector 10 is formed.

The detection terminal 50 is for detecting the voltage of the power storage element 61 and is electrically connected to the electrode terminal 63 of the power storage element 61 via the bus bar 40. The detection terminal 50 is formed by pressing a metal plate material such as copper, a copper alloy, stainless steel, or aluminum into a predetermined shape. The surface of the detection terminal 50 may be plated with a metal such as tin or nickel.

Figure 7:
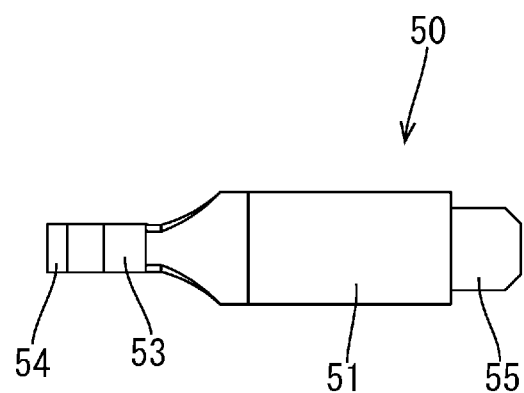
FIG. 7 is a plan view showing a detection terminal.
Figure 8:
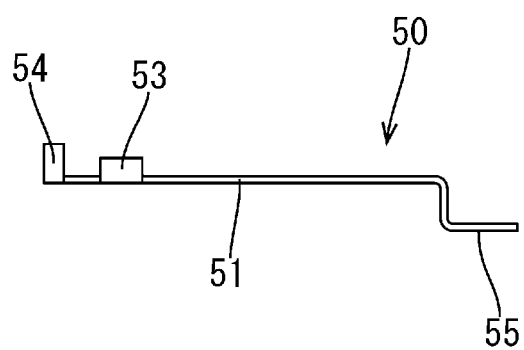
FIG. 8 is a side view showing a detection terminal.
Figure 9:
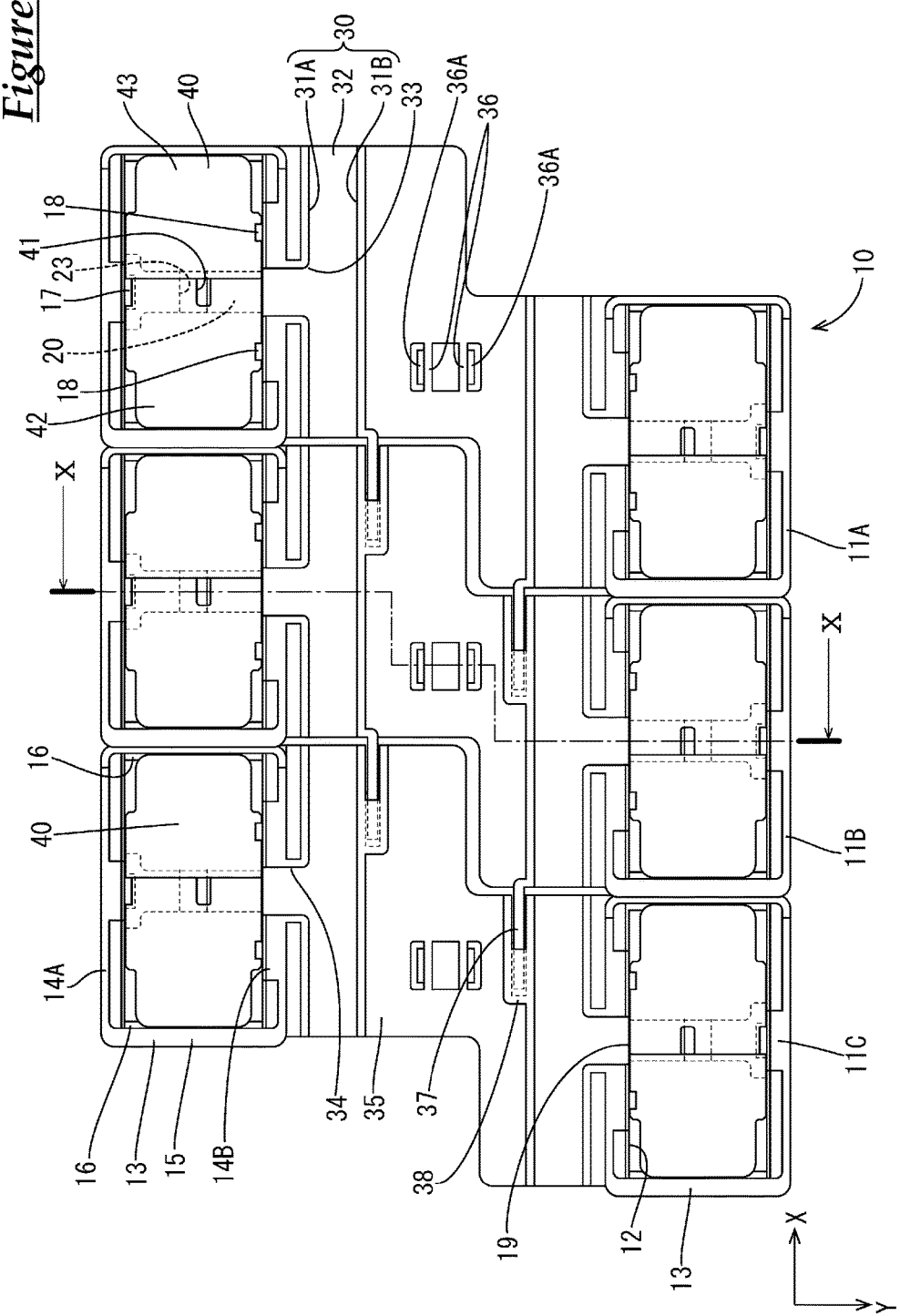
FIG. 9 is a plan view showing a state in which bus bars are housed in an insulating protector.

As shown in FIGS. 7 and 8, the detection terminal 50 of the present embodiment includes a plate-shaped terminal main body portion 51 that has an elongated rectangular shape, a wire barrel 53 that is provided adjacent to the shape, and an insulation barrel 54 that is provided in alignment with the wire barrel 53. The width dimension of the terminal main body portion 51 is set to be a dimension that is equal to or slightly smaller than being equal to the width dimension of the welding protection wall 20. The wire barrel 53 is crimped so as to wrap around an exposed core wire of the wire 58. The insulation barrel 54 is crimped so as to wrap around an insulation covering of the wire 58. The wire barrel 53 and the insulation barrel 54 are formed so as to stand upright toward one direction (the same direction) from one surface of the terminal main portion body 51.

An insertion portion 55 for locking the voltage detection terminal 50 by being inserted into the locking hole 41 of the above-described bus bar 40 is extended in a crank shape on the edge portion of the terminal main body portion 51 on the side opposite to the wire barrel 53 so as to protrude toward the side opposite to the standing direction of the wire barrel 53 and the insulation barrel 54.

The detection terminal 50 is electrically connected to a detection wire 58 by being crimped such that the wire barrel 53 wraps around the core wire of the wire 58. Also, the detection terminal 50 is bonded to the bus bar 40 through laser welding. The end portion on the side opposite to the wire 58 is connected to an ECU or the like (not shown), and the voltage of the power storage element 61 is detected by the ECU or the like.

Method for Assembling Power Storage Module M

Hereinafter, an example of a method for assembling the power storage module M will be described. The method for assembling the power storage module M is not limited to the following description.

First, the first metal portion 42 and the second metal portion 43 are formed into predetermined shaped by pressing metal plate materials. The edge of the first metal portion 42 and the edge of the second metal portion 43 are overlaid to form the overlapping portion 44. Next, the welded portion 45 of the overlapping portion 44 is welded through a known welding method. Any method, such as laser welding, ultrasound welding, resistance welding, or arc welding, can be employed as the welding method according to need.

Next, the multiple coupling units 11 are coupled to each other. Specifically, the pair of unit engagement portions 37 of the second coupling unit 11B are engaged with the pair of unit engagement reception portions 38 of the third coupling unit 11C that is adjacent thereto. Accordingly, the second coupling unit 11B and the third coupling unit 11C are coupled. The insulating protector 10 is assembled by attaching the remaining first coupling unit 11A to the second coupling unit 11B using a similar procedure (see FIG. 5).

Note that a clearance is set between the leading ends of the unit engagement portions 37 and the far ends of the unit engagement reception portions 38, and the adjacent coupling units 11 are attached so as to be displaceable in a direction in which the adjacent coupling units 11 move toward or away from each other by an amount corresponding to the clearance. Accordingly, when the wiring module 1 (the insulating protector 10) is attached to the power storage element group 60, shifting of the pitch between the adjacent electrode terminals 63 caused by a manufacturing allowance of the power storage elements 61 and an attachment allowance of the multiple aligned power storage elements 61 can be absorbed.

Next, the bus bar 40 is housed in the bus bar holding portion 12 of the insulating protector 10. The bus bar 40 is pushed downward while being guided by the housing wall 13 of the bus bar holding portion 12, and when the bus bar 40 comes into contact with the first retaining piece 17 and the second retaining pieces 18, the retaining pieces 17 and 18 are elastically deformed downward and the bus bar 40 advances further downward. Then, when the bus bar 40 is pushed past the first retaining piece 17 and the second retaining pieces 18, the bus bar 40 is held in a retained state in which it is pressed down from above due to the first retaining piece 17 and the second retaining pieces 18 elastically reverting (see FIGS. 9 and 10).

The bus bar 40 housed in the bus bar holding portion 12 is supported from below due to the two end portions in the lengthwise direction thereof being mounted on the pair of mounting portions 16 and the central portion in the lengthwise direction is supported from below by the welding protection portion 20. In other words, the bus bar 40 is put in a state in which the regions of the underside surface (lower surface) that are located between the mounting portions 16 and the welding protection portion 20 are exposed to the downward side.

Next, the detection terminal 50 is attached to the insulating protector 10. Specifically, the wire barrel 53 of the detection terminal 50 is crimped to the end portion of the exposed core wire of the wire 58, an insulation barrel 54 is crimped to the insulation covering, and the terminal main body portion 51 is caused to overlap with the bus bar 40 by being housed from above at a predetermined location of the bus bar holding portion 12 (see FIGS. 11 and 12).

At the time of the overlapping task, first, the detection terminal 50 is brought close to the bus bar 40 while inclined such that the insertion portion 55 side is located below, and after the insertion portion 55 is inserted into the locking hole 41 of the bus bar 40, the terminal main body portion 51, the wire barrel 53, and the insulation barrel 54 are caused to overlap with each other. At this time, although the welding protection portion 20 is arranged on the lower surface side of the locking hole 41 of the bus bar 40, the relief recessed portion 23 is formed in the welding protection portion 20, and therefore the insertion portion 55 does not interfere with the welding protection portion 20. The insertion portion 55 locks to the hole edge portion 41A of the locking hole 41 from below.

Also, at the same time as the terminal main body portion 51 is caused to overlap with the bus bar 40, the wire barrel 53 and the insulation barrel 54 are housed in the barrel holding groove 34. Then, the wire 58 guided from the insulation barrel 54 is arranged in the wire housing groove 30.

In this state, the detection terminal 50 is held in a state of being positioned at a predetermined position in the bus bar holding portion 12.

In this state, the detection terminal 50 may be welded to the bus bar 40. Any method, such as known laser welding, ultrasound welding, resistance welding, or arc welding, can be selected as appropriate as the welding method according to need.

The thus-assembled wiring module 1 of the present embodiment is attached to the upper surface of the power storage element group 60. Specifically, the locking pieces 36 of the insulating protector 10 are inserted into the recessed portions 67 of the power storage elements 61 and the locking protruding portions 36A are locked to the hole edges of the hole portions 68. Upon doing so, the housing walls 13 surround the adjacent pairs of electrode terminals 63. In other words, the electrode terminals 63 are housed in the pairs of electrode terminal housing portions 28 of the bus bar holding portions 12. Also, the leading end portions (upper surfaces) of the electrode terminals 63 come into contact with the lower surfaces of the bus bars 40 that are exposed downward.

In this state, a laser is emitted by a laser emission apparatus (not shown) that is arranged above the wiring module 1 (on the side of the voltage detection terminals 50 that is opposite to the bus bars 40), and the bus bars 40 and the electrode terminals 63 are welded through laser welding.

If the detection terminals 50 and the bus bars 40 have not been welded in the step of attaching the wiring module 1 to the power storage element group 60, the terminal main body portions 51 of the detection terminals 50 and the bus bars 40 are welded through laser welding in this stage. Thus, the power storage module M is completed (see FIG. 13).

Effects of the Present Embodiment

Next, actions and effects of the present embodiment will be described. The wiring module according to the present embodiment is a wiring module 1 attached to a power storage element group 60 in which multiple power storage elements 61 having cathodes 63A composed of a first metal and anodes 63B composed of a second metal that is different from the first metal are aligned. The wiring module 1 includes: bus bars 40 having first metal portions 42 composed of the first metal and second metal portions 43 composed of the second metal; an insulating protector 10 for holding the bus bars 40; and detection terminals 50 connected to the bus bars 40. The bus bars 40 include overlapping portions 44 at which portions of the first metal portions 42 and portions of the second metal portions 43 overlap, and the bus bars 40 include terminal connection portions 46 on which the detection terminals 50 are overlaid, at positions different from those of the welded portions 45.

According to the present embodiment, the positions of the terminal detection portions 46 are different from those of the welded portions 45 at which the first metal portions 42 and the second metal portions 43 are welded. Accordingly, unevenness caused by welding the first metal portions 42 and the second metal portions 43 is not formed on the surfaces of the terminal connection portions 46. As a result, the detection terminals 50 are overlaid on terminal connection portions 46 that are flat compared to the welded portions 45, and therefore the reliability of the electrical connections between the detection terminals 50 and the bus bars 40 can be improved.

Also, according to the present embodiment, the overlapping portions 44 include hole edge portions 41A of locking holes 41, which hold the detection terminals 50 on the terminal connection portions 46, and the detection terminals 50 include insertion portions 55 that are inserted into the locking holes 41 and lock to the hole edge portions 41A of the locking holes 41.

Due to the hole edge portions 41A of the locking holes 41 and the insertion portions 55 being locked, the detection terminals 50 can be held on the terminal connection portions 46 of the overlapping portions 44.

The regions different from those of the overlapping portions 44 are relatively flat, and therefore it is possible to preferably connect the bus bars 40 and the cathodes 63A and anodes 63B. According to the present embodiment, the terminal connection portions 46 are provided at positions of the overlapping portions 44 that are different from those of the welded portions 45. For this reason, wider connection regions of the bus bars 40 and the cathodes 63A and wider connection regions of the bus bars 40 and the anodes 63B can be ensured, and therefore it is possible to improve the reliability of the electrical connections between the bus bars 40 and the cathodes 63A and anodes 63B.

Also, according to the present embodiment, the overlapping portions 44 and the detection terminals 50 are welded at the terminal connection portions 46.

According to the above-described embodiment, the overlapping portions 44 and the detection terminals 50 can be electrically connected through welding, which is a simple method, and therefore the manufacturing cost can be reduced.

Also, with the power storage module according to the present embodiment, the first metal portions 42 and the cathodes 63A are welded, and the second metal portions 43 and the anodes 63B are welded.

According to the present embodiment, the bus bars 40 and the cathodes 63A can be welded through welding and the bus bars 40 and the anodes 63B can be welded through welding. Accordingly, it is possible to improve the task efficiency compared to the case of connecting the bus bars 40 and the cathodes 63A and anodes 63B by screwing bolts or nuts.

Embodiment 2

Next, Embodiment 2 will be described with reference to FIGS. 14 to 19.

As shown in FIG. 14, a bus bar 80 according to the present embodiment has a flat plate shape. In the vicinity of the central position in the left-right direction of the bus bar 80, an overlapping portion 81 at which the first metal portion 42 and the second metal portion 43 overlap is formed. The overlapping portion 81 is indicated with shading in FIG. 14.

The overlapping portion 81 according to the present embodiment is formed into a flat shape by being pressed or the like. The first metal portion 42 and the second metal portion 43 of the overlapping portion 81 according to the present embodiment overlapping encompasses a state in which the first metal portion 42 and the second metal portion 43 are overlaid vertically, as well as a state in which the first metal portion 42 and the second metal portion 43 are subjected to metallic bonding to be integrated, the metal constituting the first metal portion 42 and the metal constituting the second metal portion 43 becomes an alloy, and the metal components overlap with each other.

The overlapping portion 81 is formed at a position that is slightly rearward with respect to the center in the front-rear direction, with a rectangular locking hole 84 for locking the insertion portion 83 (an example of a locking receiving portion) of the detection terminal 82 penetrating through the plate surface. The insertion portion 83 locks to a hole edge portion 84A (an example of a locking portion) of the locking hole 84.

Figure 15:
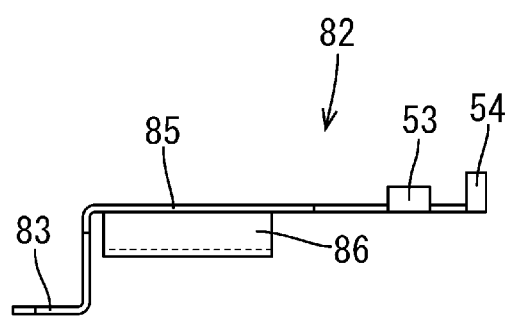
FIG. 15 is a side view showing a detection terminal.
Figure 16:
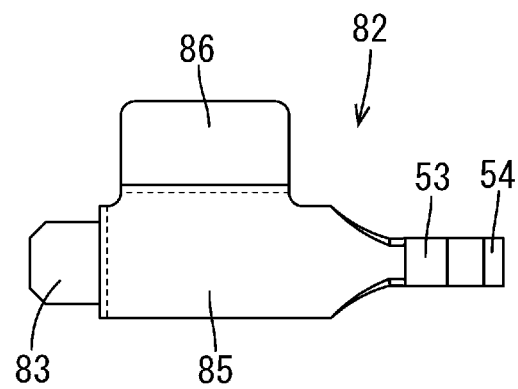
FIG. 16 is a plan view showing a detection terminal.

As shown in FIGS. 15 and 16, the detection terminal 82 of the present embodiment includes a plate-shaped terminal main body portion 85 having an elongated rectangular shape, a wire barrel 53 provided adjacent to the terminal main body portion 85, and an insulation barrel 54 provided in alignment with the wire barrel 53.

An insertion portion 83 for locking the detection terminal 82 by being inserted into the locking hole 84 of the bus bar 80 is extended in a crank shape on the edge portion of the terminal main body portion 85 on the side opposite to the wire barrel 53 so as to protrude toward the side opposite to the standing direction of the wire barrel 53 and the insulation barrel 54.

A connected portion 86 that has a crank shape is extended on one side edge of the terminal main body portion 85 so as to protrude toward the opposite side in the standing direction of the wire barrel 53 and the insulation barrel 54. The dimension by which the connected portion 86 protrudes from the terminal main body portion 85 is set to be smaller than the dimension by which the insertion portion 83 protrudes from the terminal main body portion 85.

Figure 17:
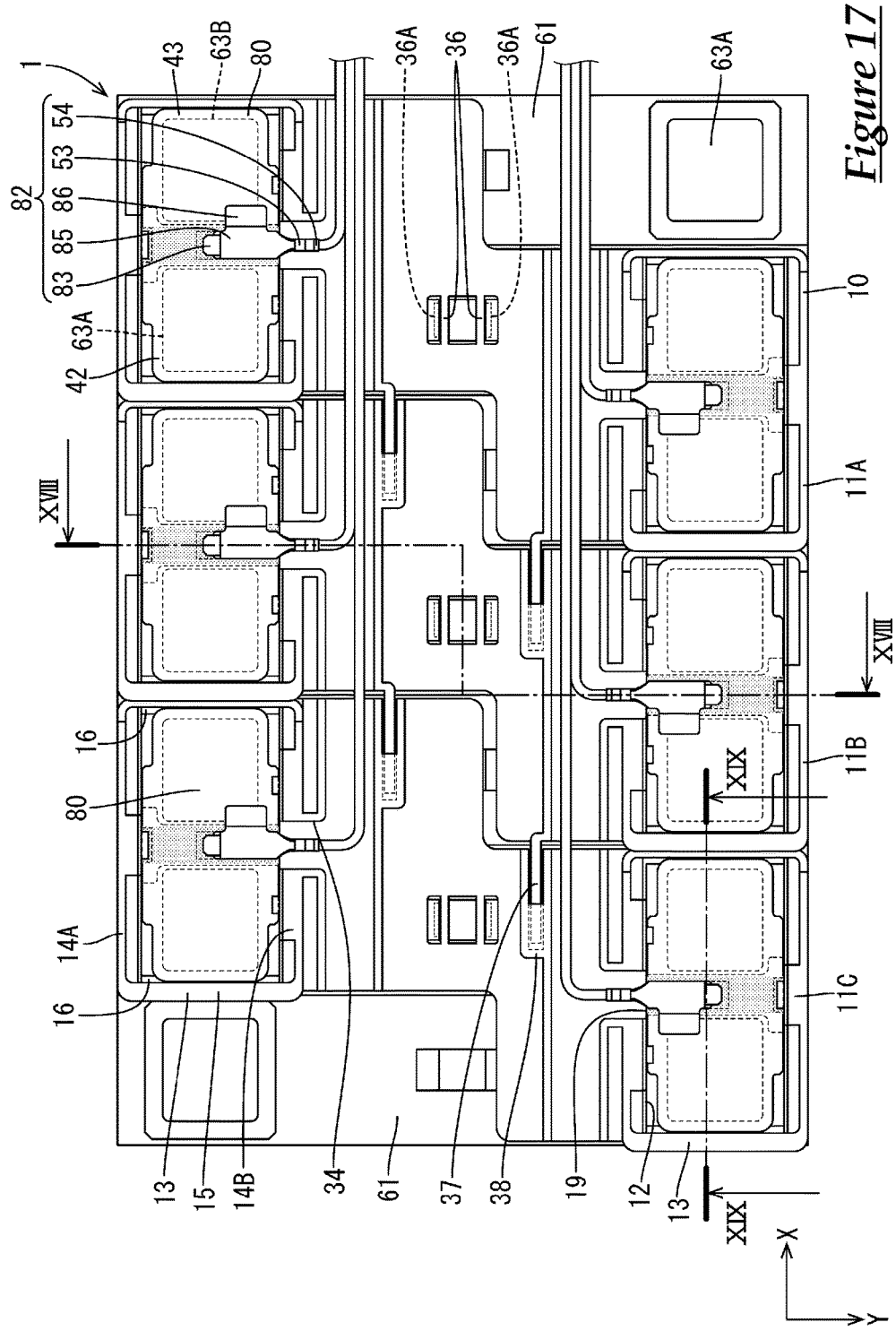
FIG. 17 is a plan view showing a power storage element group according to Embodiment 2.
Figure 18:
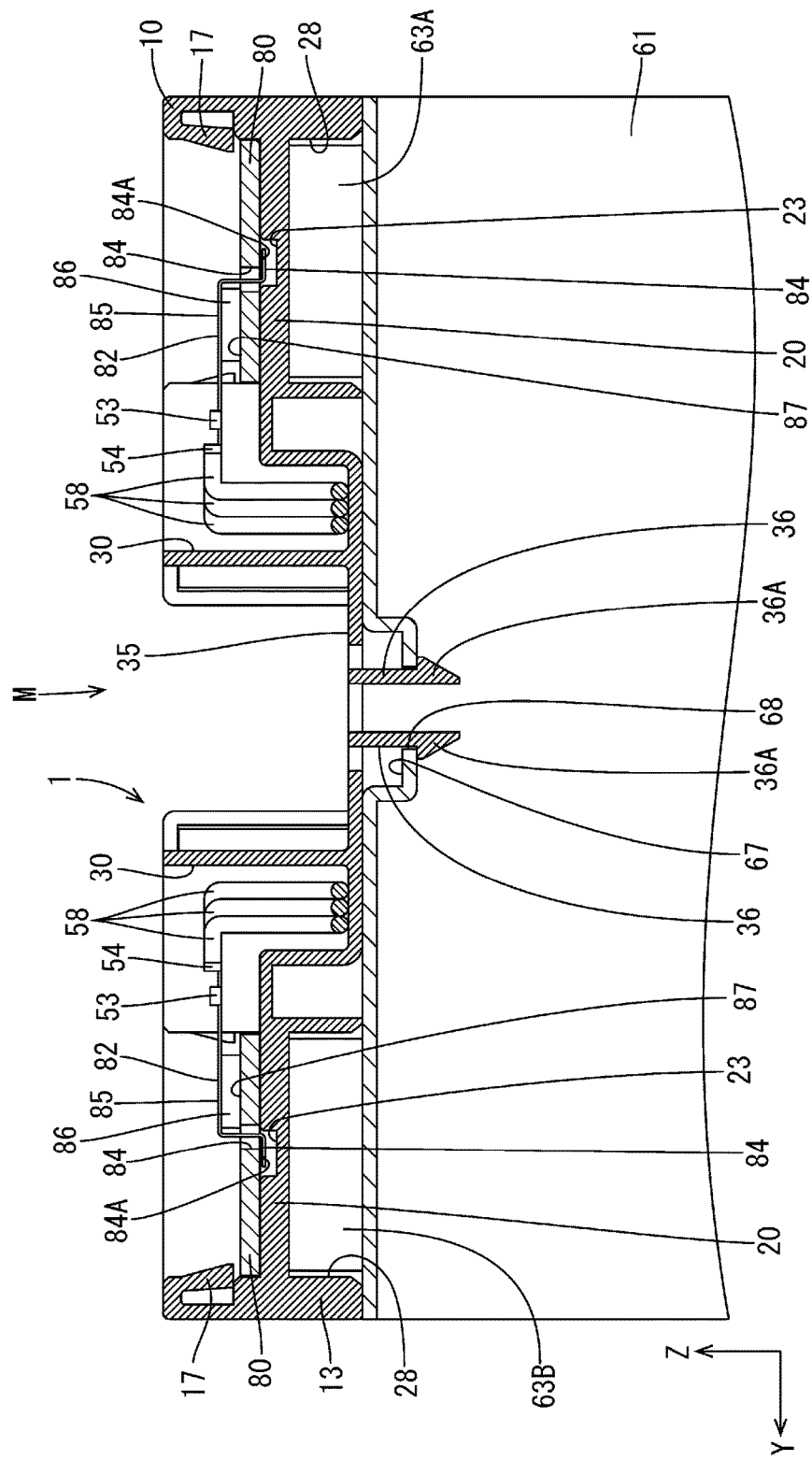
FIG. 18 is a cross-sectional view taken along line XVIII-XVIII in FIG. 17.
Figure 19:
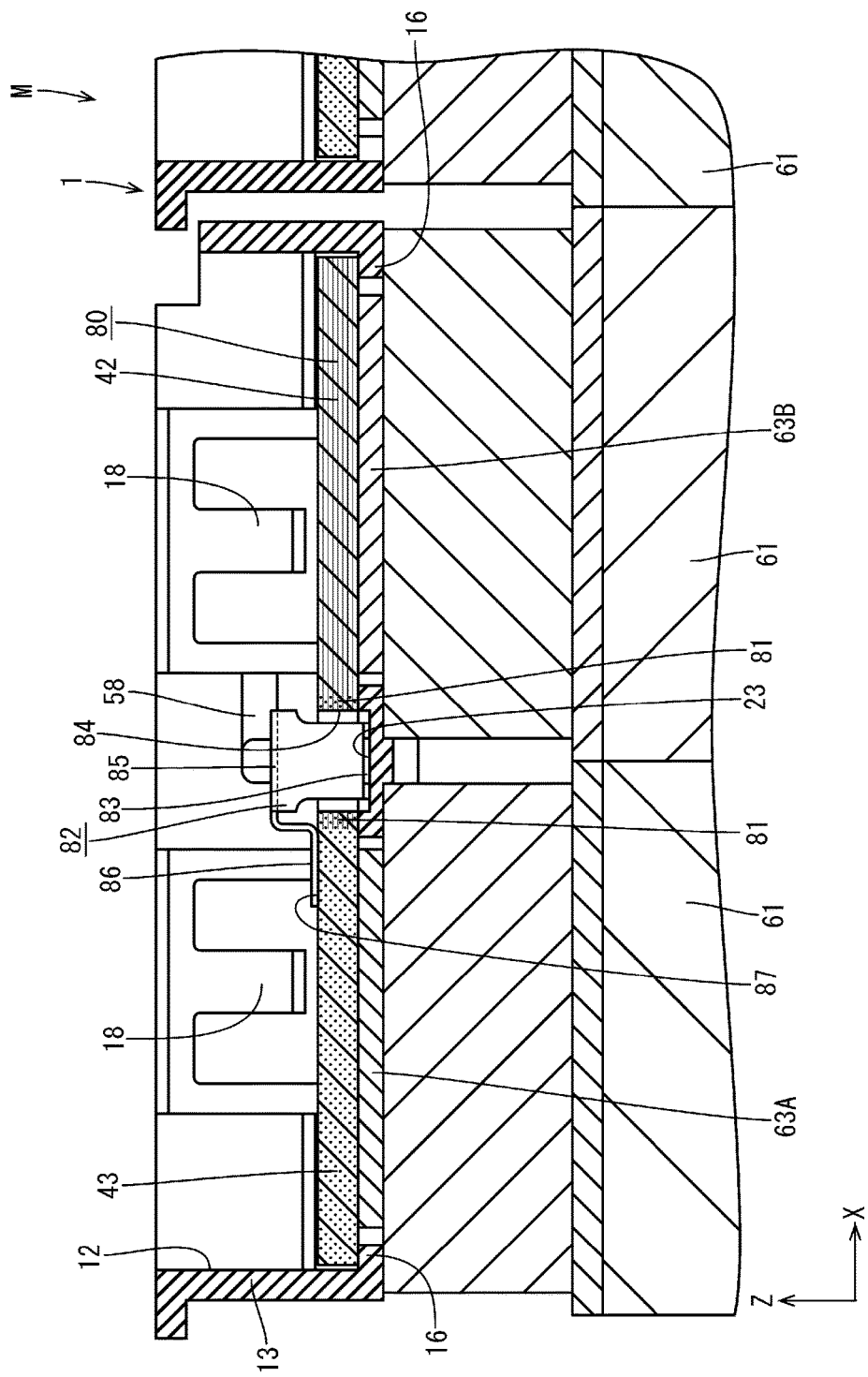
FIG. 19 is a cross-sectional view taken along line XIX-XIX in FIG. 17.

As shown in FIGS. 17 to 19, in the state in which the insertion portions 83 of the detection terminals 82 are locked in the locking holes 84, the connected portions 86 are in contact from above with portions of the upper surfaces of the bus bars 80 that are different from those of the overlapping portions 81. The portions of the bus bars 80 that come into contact with the connected portions 86 of the detection terminals 82 are the terminal connection portions 87. The connected portions 86 of the detection terminals 82 and the terminal connection portions 87 of the bus bars 80 overlap vertically. The connected portions 86 and the terminal connection portions 87 are connected using a known method, such as welding or soldering.

Configurations other than those described above are similar to those of Embodiment 1, and therefore identical members are denoted by identical reference signs and redundant description thereof is not included.

The overlapping portion 81 according to the present embodiment is connected in a state in which the first metal portion 42 and the second metal portion 43 are overlaid, and therefore the overlapping portion 81 is less flat compared to portions of the bus bar 80 other than the overlapping portion 81. In the present embodiment, the terminal connection portion 87 is provided at a position that is different from that of the overlapping portion 81, and therefore the detection terminal 82 is connected to the bus bar 80 at a relatively flat portion of the bus bar 80. As a result, the reliability of the electrical connection between the detection terminal 82 and the bus bar 80 can be further improved.

Other Embodiments

The technique disclosed in the present specification is not limited to the embodiment described in the above description and drawings, and for example, the following embodiments are encompassed in the technical scope as well.

In the above-described embodiment, an example was given in which the bus bar 40 and the voltage detection terminal 50 are laser-welded, but it is possible to apply the technique disclosed in the present specification also to a case of performing welding through another welding means, such as arc welding.

In the above-described embodiment, an example was given in which the voltage detection terminal 50 is welded to the bus bar 40, but the technique disclosed in the present specification can be applied also to a case of welding another detection terminal, such as a current detection terminal or a temperature detection terminal.

In the above-described embodiment, an example was given in which a secondary battery is used as the power storage element 61, but the technique disclosed in the present specification can be applied also to a laminate-type of power storage element group 60.

In the above-described embodiment, the insulating protector 10 included three coupling units 11A, 11B, and 11C, but the insulating protector 10 may be obtained by coupling two or four or more coupling units 11. Also, three or more bus bar holding portions 12 may be provided in one coupling unit 11. Alternatively, the insulating protector 10 may be constituted by one member.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Wiring module
10 Insulating protector
40, 80 Bus bar
41A Hole edge portion
42 First metal portion
43 Second metal portion
44, 81 Overlapping portion
45 Welded portion
46, 87 Terminal connection portion
50, 82 Detection terminal
55, 83 Insertion portion
60 Power storage element group
61 Power storage element
63A Cathode
63B Anode
86 Connected portion
M Power storage module

The invention claimed is:

1. A wiring module to be attached to a power storage element group in which a plurality of power storage elements having cathodes composed of a first metal and anodes composed of a second metal that is different from the first metal are aligned, comprising:

bus bars having first metal portions composed of the first metal and second metal portions composed of the second metal;
an insulating protector for holding the bus bars; and
detection terminals connected to the bus bars,
wherein the bus bars have overlapping portions at which portions of the first metal portions and portions of the second metal portions overlap,
the overlapping portions have welded portions at which the first metal portions and the second metal portions are welded, and
the bus bars have terminal connection portions on which the detection terminals are overlaid, at positions different from the positions of the welded portions,
the overlapping portions include locking portions for holding the detection terminals on the terminal connection portions, and
the detection terminals have locking receiving portions for locking to the locking portions.

2. A wiring module to be attached to a power storage element group in which a plurality of power storage elements having cathodes composed of a first metal and anodes composed of a second metal that is different from the first metal are aligned, comprising:

bus bars having first metal portions composed of the first metal and second metal portions composed of the second metal;
an insulating protector for holding the bus bars; and
detection terminals connected to the bus bars,
wherein the bus bars have overlapping portions at which portions of the first metal portions and portions of the second metal portions overlap,
the overlapping portions have welded portions at which the first metal portions and the second metal portions are welded, and
the bus bars have terminal connection portions on which the detection terminals are overlaid, at positions different from the positions of the welded portions, and
the terminal connection portions are provided at positions of the overlapping portions that are different from the positions of the welded portions.

3. The wiring module according to claim 1, wherein the terminal connection portions are provided at positions that are different from the positions of the overlapping portions.

4. The wiring module according to claim 1, wherein the detection terminals and the bus bars are welded on the terminal connection portions.

5. A power storage module comprising the wiring module according to claim 1 attached to the power storage element group,
wherein the first metal portions of the bus bars and the cathodes are welded, and the second metal portions of the bus bars and the anodes are welded.

\* \* \* \* \*